United States Patent
Bolisetty

(10) Patent No.: US 11,836,076 B2
(45) Date of Patent: *Dec. 5, 2023

(54) IMPLEMENTING MAPPING DATA STRUCTURES TO MINIMIZE SEQUENTIALLY WRITTEN DATA ACCESSES

(71) Applicant: Micron Technology, Inc., Boise, ID (US)

(72) Inventor: Naveen Bolisetty, Suryapet (IN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,327

(22) Filed: Feb. 3, 2023

(65) Prior Publication Data

US 2023/0185712 A1    Jun. 15, 2023

Related U.S. Application Data

(63) Continuation of application No. 17/487,396, filed on Sep. 28, 2021, now Pat. No. 11,615,020.

(30) Foreign Application Priority Data

Aug. 12, 2021    (IN) .............................. 202141036475

(51) Int. Cl.
*G06F 12/00*       (2006.01)
*G06F 12/02*       (2006.01)
*G06F 12/1045*  (2016.01)
*G06F 3/06*         (2006.01)
*G06F 12/1009*  (2016.01)
*G06F 12/1027*  (2016.01)

(52) U.S. Cl.
CPC ........ *G06F 12/0246* (2013.01); *G06F 3/0604* (2013.01); *G06F 3/0656* (2013.01); *G06F 3/0673* (2013.01); *G06F 12/1009* (2013.01); *G06F 12/1027* (2013.01); *G06F 12/1054* (2013.01); *G06F 2212/65* (2013.01); *G06F 2212/68* (2013.01); *G06F 2212/7201* (2013.01)

(58) Field of Classification Search
CPC .... G06F 3/0659; G06F 3/0604; G06F 3/0617; G06F 3/0631; G06F 3/0688
See application file for complete search history.

(56) References Cited

U.S. PATENT DOCUMENTS

| | | |
|---|---|---|
| 9,977,612 B1 | 5/2018 | Lo |
| 2014/0258588 A1 | 9/2014 | Tomlin |
| 2015/0186264 A1 | 7/2015 | Lin |
| 2015/0212937 A1 | 7/2015 | Stephens |

(Continued)

*Primary Examiner* — John A Lane
(74) *Attorney, Agent, or Firm* — Lowenstein Sandler LLP

(57) ABSTRACT

A system includes a memory device, and a processing device, operatively coupled to the memory device, to perform operations including storing, on a volatile memory device, logical-to-physical (L2P) mapping data corresponding to sequentially written data, determining whether an L2P update criterion is satisfied, and in response to determining that the L2P update criterion is satisfied, updating an L2P mapping data structure based on the L2P mapping data. The L2P mapping data structure maintains an initial logical translation unit (LTU) of the sequentially written data, and a length of the sequentially written data from the initial LTU.

20 Claims, 6 Drawing Sheets

(56) References Cited

U.S. PATENT DOCUMENTS

| | | |
|---|---|---|
| 2017/0322888 A1 | 11/2017 | Booth |
| 2018/0095680 A1 | 4/2018 | Peterson |
| 2019/0035473 A1 | 1/2019 | Rajamani |
| 2020/0125268 A1 | 4/2020 | Li |
| 2020/0133833 A1 | 4/2020 | Hughes |
| 2021/0026548 A1 | 1/2021 | Kang |
| 2021/0056021 A1 | 2/2021 | Parry |
| 2021/0056044 A1 | 2/2021 | Grosz |
| 2021/0405914 A1* | 12/2021 | Lam ................ G06F 3/0679 |
| 2022/0382453 A1* | 12/2022 | Duan ................ G06F 3/064 |

* cited by examiner

FIG. 3

| LTU | FPA | Length |
|---|---|---|
| 0 | 400400 | 32 |
| 1 | | |
| 2 | | |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |
| 21 | | |
| 22 | | |
| 23 | | |
| 24 | | |
| 25 | | |
| 26 | | |
| 27 | | |
| 28 | | |
| 29 | | |
| 30 | | |
| 31 | | |

US 11,836,076 B2

IMPLEMENTING MAPPING DATA STRUCTURES TO MINIMIZE SEQUENTIALLY WRITTEN DATA ACCESSES

REFERENCE TO RELATED APPLICATIONS

The present application claims the benefit of priority under 35 U.S.C. § 119 to Indian Patent Application No. 202141036475 filed on Aug. 12, 2021, and claims the benefit of earlier filing date under 35 U.S.C. § 120 to U.S. patent application Ser. No. 17/487,396 filed on Sep. 28, 2021, the entire contents of which are incorporated by reference herein.

TECHNICAL FIELD

Embodiments of the disclosure relate generally to memory sub-systems, and more specifically, relate to implementing mapping data structures to minimize sequentially written data accesses.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a diagram of a logical translation unit (LTU) to flash physical address (FPA) mapping data structure in accordance with some embodiments of the present disclosure.

DETAILED DESCRIPTION

Figure 1:
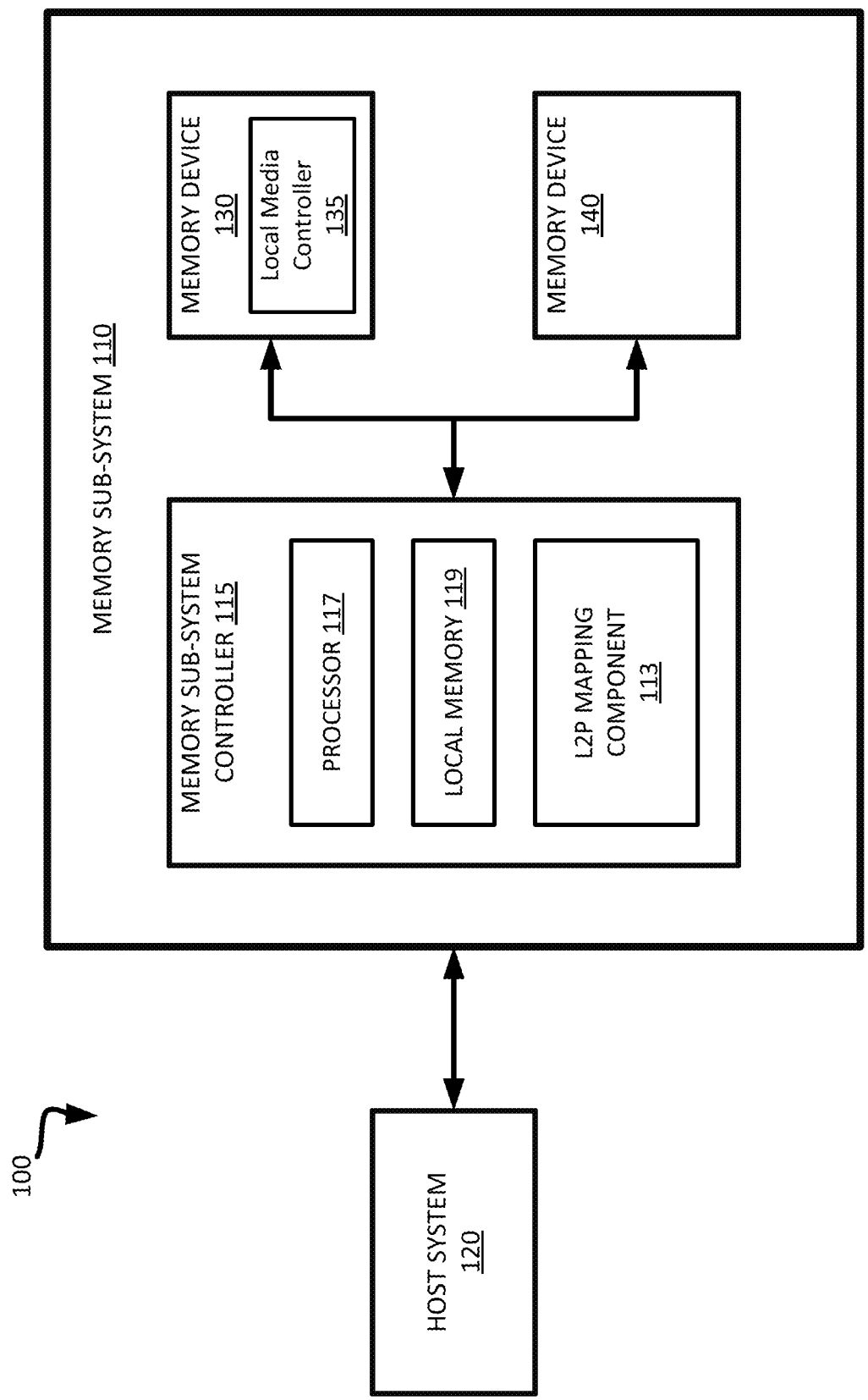
FIG. 1 illustrates an example computing system that includes a memory sub-system in accordance with some embodiments of the present disclosure.

Aspects of the present disclosure are directed to implementing mapping data structures to minimize sequentially written data accesses. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more memory planes ("planes"). For some types of non-volatile memory devices (e.g., NAND devices), each plane consists of a set of physical blocks ("blocks"). Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. The memory cells are etched onto a silicon wafer in an array of columns (also referred to as bitlines) and rows (also referred to as wordlines). A wordline can refer to one or more rows of memory cells of a memory device that are used with one or more bitlines to generate the address of each of the memory cells. The intersection of a bitline and wordline constitutes the address of the memory cell. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

For example, a memory device (e.g., NAND) of a memory sub-system (e.g., SSD) can be associated with a number of logical units (LUs) each providing a logical representation of a portion of the memory device (e.g., storage volume). Each LU is assigned a logical unit number (LUN) which is used by a host system to identify the LU when attached to the host system using a suitable interface standard. For example, a LUN can be associated with a plane of the memory device, and each plane can include a number of physical translation units (PTUs). A PTU corresponds to a base granularity of data managed by the memory device. For example, each PTU can correspond to a physical address, which defines a physical location of the memory device with respect to a particular LUN and plane. In some examples, a given LUN can include 4 planes, and each of the planes can include 4 PTUs (e.g., 16 PTUs per LUN).

Upon receiving a data access request (e.g., read command and/or write command) from the host system designating a logical address (e.g., LTU), the logical address is translated into the corresponding physical address of the memory device (e.g., LUN, plane, PTU) to handle the data access request. To do so, a logical-to-physical (L2P) mapping data structure (e.g., L2P mapping table) can be maintained to manage the translations. The L2P mapping table maintains, for a number of logical addresses, a one-to-one mapping to respective physical addresses. For example, in the case of NAND flash memory, a logical address can be a logical translation unit (LTU). The logical addresses can correspond to a number of contiguous physical addresses on the memory device (e.g., 16 LTUs, 32 LTUs, 64 LTUs). That is, if data is sequentially written to contiguous locations of the memory device, then consecutive logical addresses can be present in the same block or page. In the case of NAND flash memory, the physical addresses can be referred to as flash physical addresses (FPAs). For example, if the L2P mapping data structure maintains 32 LTUs, denoted as $LTU_0$ through $LTU_{31}$ and 32 FPAs, denoted as $FPA_0$ through $FPA_{31}$, the L2P mapping data structure can define mappings between $LTU_0$ through $LTU_{31}$ and respective ones of $FPA_0$ through $FPA_{31}$. A memory sub-system controller ("controller") can be responsible for maintaining the L2P mapping data structure (e.g., L2P mapping table) on volatile memory (e.g., DRAM).

Generally, with NAND flash memory, rather than overwriting a page of a particular block, updated data can be written to a "free" (e.g., erased) page of a different block and the page including the old data can be marked as an invalid page. A process referred to as "garbage collection" can be performed to maintain free blocks that are available for writing data by identifying one or more candidate blocks for reclaiming. The one or more candidate blocks can include valid and/or invalid data. For example, valid data can refer to data corresponding to a page having a current (e.g., up to date) L2P mapping entry, and invalid data can refer to data corresponding to a page whose mapping entry is stale (e.g., the corresponding logical page has been remapped to a new physical page). Valid pages of a given candidate block can be copied to another block prior to the given candidate block being erased during garbage collection. The garbage collection process utilizes read and write operations, which can result in write amplification and therefore lead to an increase in memory sub-system (e.g., SSD) power consumption and/or decrease the lifespan of the memory sub-system (e.g., memory cells can become unusable after experiencing a certain number of program/erase cycles).

However, certain L2P mapping data structures maintained in volatile memory (e.g., DRAM) are updated on an individual L2P entry basis per LTU during write operations. Moreover, in response to receiving a host read request for the sequentially written data, the controller can issue individual read requests to each of the corresponding LTUs from such L2P mapping data structures. Individual access to entries in such L2P mapping data structures for sequentially written data can lead to increased resource utilization. Accordingly, certain L2P mapping data structures can be inefficient, at least with respect to managing data accesses to sequentially written data.

Aspects of the present disclosure address the above and other deficiencies by having a memory sub-system that implements L2P mapping data structures to minimize data accesses for sequentially written data. For sequentially written data, a controller (e.g., controller firmware) can update the L2P mapping data structure. An L2P mapping data structure described herein includes a specific field, denoted as "length," which corresponds to a length of data sequentially written to a same block of a memory device (e.g., by host system writes and/or garbage collection writes). More specifically, a group of LTUs corresponding to logical addresses of the sequentially written data can include an initial LTU entry. For example, the group of LTU entries can include 16 LTUs, 32 LTUs, 64 LTUs, 128 LTUs, etc. The L2P mapping data structure can further include a starting physical address (e.g., FPA) entry corresponding to the initial LTU entry, and a length of the sequentially written data corresponding to the number of LTU entries in the group.

By defining the group of LTUs using a single physical address and a length, access to the L2P mapping data structure in volatile memory can be reduced. For example, during host writes, the L2P mapping data structures described herein can be updated using a single entry update, as compared to L2P mapping data structures that maintain individual LTU to physical address mappings that require individual entry updates per LTU. As another example, during a host read to the group of LTUs, the L2P mapping data structures described herein can enable reduced volatile memory access by having the controller issue a single L2P read request to volatile memory. This is in comparison to L2P mapping data structures, in which the controller would end up issuing individual L2P read requests to volatile memory to obtain an L2P entry for each individual LTU of the group.

Advantages of the present disclosure include, but are not limited to, reduced controller overhead and improved performance in data access paths (e.g., read and/or write paths).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes an L2P mapping component 113. In some embodiments, the memory sub-system controller 115 includes at least a portion of the L2P mapping component 113. In some embodiments, the L2P mapping component 113 is part of the host system 110, an application, or an operating system. In other embodiments, local media controller 135 includes at least a portion of L2P mapping component 113 and is configured to perform the functionality described herein.

For example, as will be described in further detail below with reference to FIG. 4, the L2P mapping component 113 can initiate accumulation of L2P mapping data during a write operation while postponing updates to an L2P mapping data structure. The L2P mapping component 113 can terminate the accumulation of the L2P mapping data if the L2P mapping component 113 determines that a criterion for terminating the accumulation of the L2P mapping data is satisfied. At that point, the L2P mapping component 113 can update the L2P mapping data structure using the L2P mapping data that has been accumulated. The L2P mapping data structure can include a physical address (e.g., FPA) corresponding to an initial LTU, and a length of the sequentially written data from the initial LTU. In some embodiments, the L2P mapping data structure is a table having an LTU column including the initial LTU, a starting physical address entry, and a length entry.

As will be described in further detail below with reference to FIG. 5, the L2P mapping component 113 can service a read request to read sequentially written data using the L2P mapping data structure. By maintaining a group of LTUs based on a starting physical address and a length, instead of an association of each LTU of the group to a respective physical address, the use of L2P mapping structures by the L2P mapping component 113 can minimize data accesses with respect to sequentially written data. Therefore, updating an L2P mapping data structure as described herein can achieve reduced resource consumption by the memory sub-system controller 115 and/or other components of the memory sub-system 110. Further details regarding mapping data structure and the operations of the L2P mapping component 113 are described below with reference to FIGS. 2-5.

Figure 2:
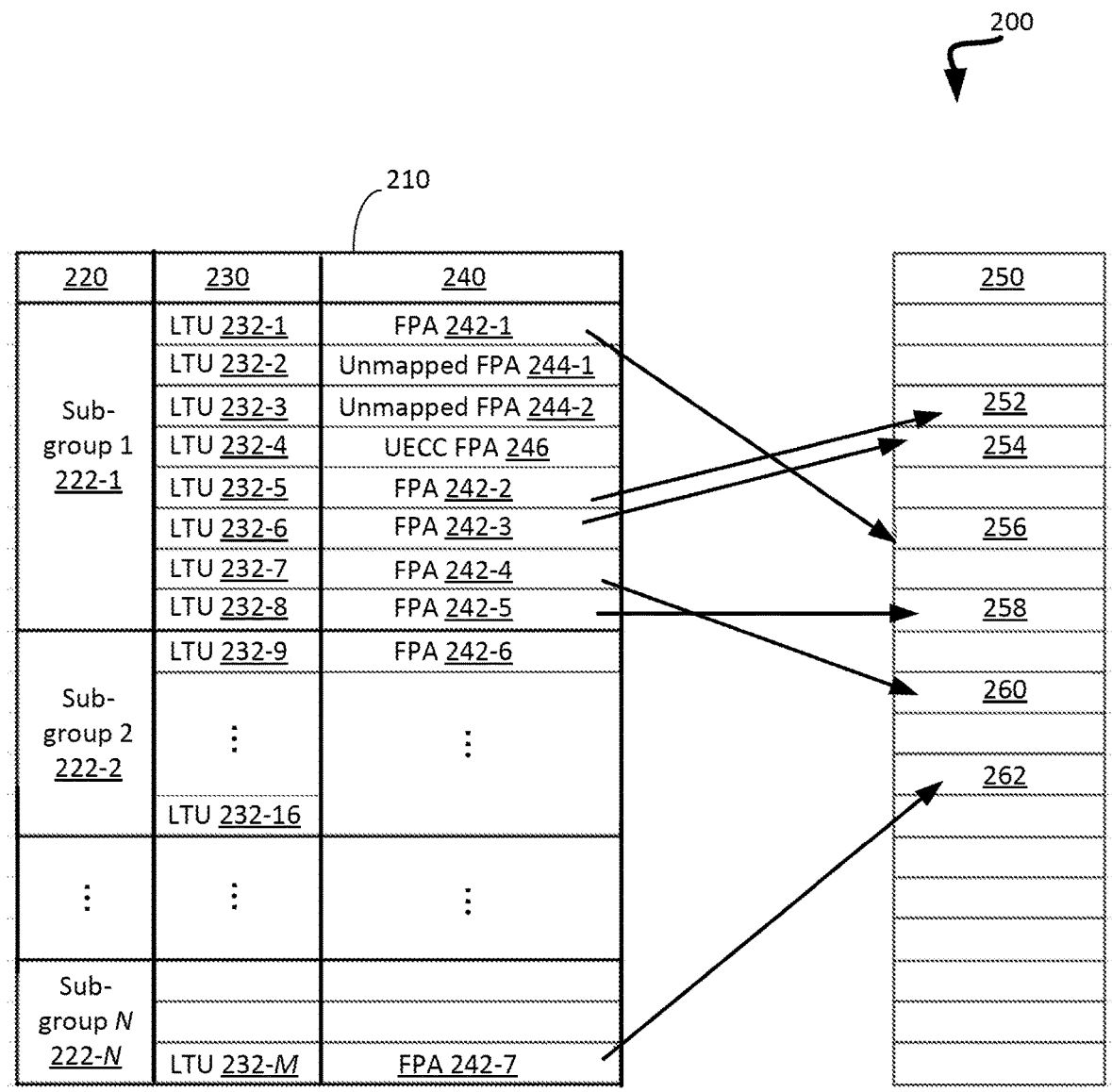
FIG. 2 is a diagram of an example organization of logical-to-physical (L2P) mapping data in accordance with some embodiments of the present disclosure.

FIG. 2 is a diagram 200 showing an example organization of logical-to-physical (L2P) mapping data in accordance with some embodiments of the present disclosure. More specifically, the diagram 200 shows how L2P mapping data can be maintained in controller memory, such as in volatile memory (e.g., DRAM) or in non-volatile memory. In this illustrative example, it is assumed that the non-volatile memory is NAND flash memory. However, such embodiments should not be considered limiting.

As shown, the diagram 200 includes an L2P mapping table ("table") 210. The table 210 includes a number of columns, including a sub-group column 220, an LTU column 230, and a NAND memory address column 240. The column 220 includes N sub-group entries corresponding to sub-groups 222-1 through 222-N, and the column 230 includes MLTU entries corresponding to LTUs 232-1 through 232-M. The value M corresponds to the maximum number of supported LTU entries. Each of the sub-groups 222-1 through 222-N is a sub-group of the entire group of LTUs 232-1 through 232-M. In this illustrative example, sub-group 1 222-1 includes LTUs 232-1 through 232-8, sub-group 2 222-2 includes LTUs 232-9 through 232-16, etc., such that each sub-group includes an 8 LTU subset of the group of LTUs 232-1 through 232-M. However, this example should not be considered limiting.

As further shown, the table 210 further includes a NAND memory address column 240. The column 240 includes FPA data entries corresponding to each of the LTUs 232-1 through 232-M. As shown, the column 240 includes FPA entries 242-1 through 242-7 corresponding to respective ones of LTUs 232-1, 232-5 through 232-9 and 232-M. During a host write, once data is written to NAND, the controller maintains the location as the FPA, which will be updated in the table 210 against the corresponding LTU. For example, the diagram 200 further includes a table 250 corresponding to NAND memory, including NAND memory entries 252 through 262. The table 25 is provided for the sake of illustration, and may not be present anywhere in the controller memory. Each entry 242-1 through 242-7 points to one physical location in the NAND memory. In this example, FPA 242-1 maps to entry 252, FPA 242-2 maps to entry 256, FPA 242-3 maps to entry 254, FPA 242-4 maps to entry 260, FPA 242-5 maps to entry 258, and FPA 242-7 maps to entry 262.

As further shown, the column 240 includes unmapped FPA entries 244-1 and 244-2. Each unmapped FPA entry corresponds to an LTU that has data not yet written from the host (e.g., LTU data that is not yet present in the NAND memory). The column 240 further includes an uncorrectable error (UECC) FPA entry 246. The entry 246 corresponds to a location of data in the NAND that is unreadable (e.g., corrupted data location).

FIG. 3 is an example logical-to-physical (L2P) mapping data structure 300 in accordance with some embodiments of the present disclosure. In this illustrative example, the L2P mapping data structure 300 performs LTU to FPA mapping with respect to a memory device (e.g., NAND). However, this example should not be considered limiting.

As shown, the L2P mapping data structure 300 includes a group of LTU entries 310 ("0" through "31"). In this illustrative example, the group of LTU entries includes 32 LTU entries. However, the group of LTU entries 310 can include any suitable number of LTU entries. The group of LTU entries 310 can be broken up into sub-groups, as described above with reference to FIG. 2.

The LTU entries of the group of LTU entries 310 are logical addresses that correspond to physical addresses of sequentially written data on the memory device. For example, each LTU entry can be mapped to a particular FPA, where the FPA can be translated into the corresponding physical address. In this example, LTU 0 can be mapped to FPA 400400, LTU 1 can be mapped to FPA 400401, . . . . LTU 9 can be mapped to 400409, LTU 10 can be mapped to 40040A, LTU 15 can be mapped to 40040F, LTU 16 can be mapped to 400410, . . . and LTU 31 can be mapped to 40041F. However, this mapping can result in individual update of L2P entries per LTU, which is a waste of resources since the data is sequentially written. For example, separate read requests would need to be issued for each of the LTUs 0 through 31.

To reduce volatile memory access for the sequentially written data and reduce resource utilization, the L2P mapping data structure 300 structures the group of LTUs 310 as a single entry made to volatile memory during an update. To do so, the L2P mapping data structure 300 further includes a single FPA entry 320 that is designated as a starting FPA of the sequentially written data, and a length entry 330 that indicates the length of the sequentially written data from the starting FPA. In this example, the starting FPA is 400400 as this corresponds to the first LTU 0, and the length is 32 since there are 32 LTU entries in the group of LTU entries 310. Further details regarding the implementation of the data structure 310 will be described below with reference to FIGS. 4-6.

Figure 4:
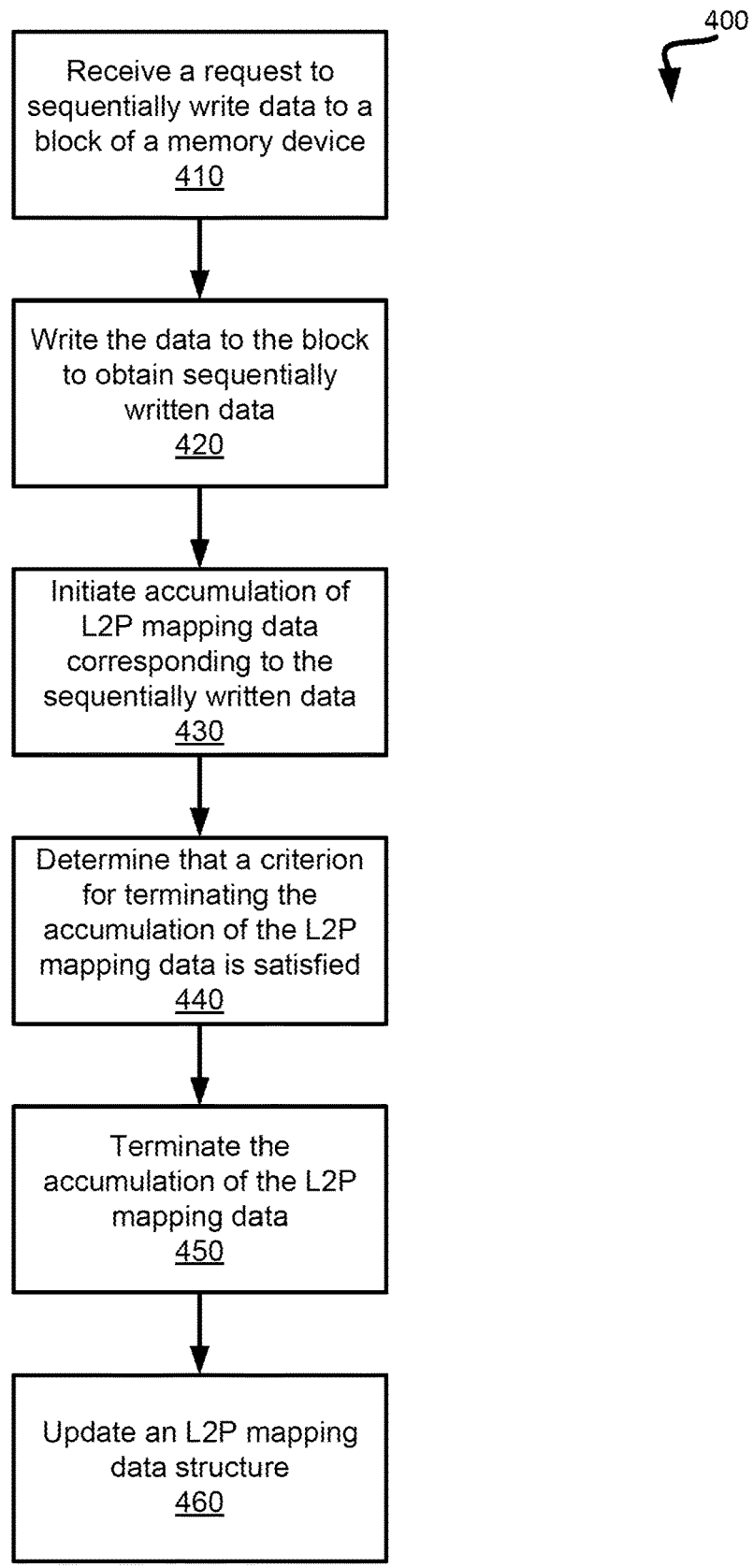
FIG. 4 is a flow diagram of an example method for handling updates to a mapping data structure during a write operation in accordance with some embodiments of the present disclosure.

FIG. 4 is a flow diagram of an example method for handling updates to a mapping data structure during a write operation in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the L2P mapping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a request to perform a sequential write operation to write data to a block of a memory device. At operation 420, the processing logic writes the data to the block to obtain sequentially written data. The locations on the block correspond to physical addresses. For example, the physical addresses can correspond to flash physical addresses (FPAs).

At operation 430, the processing logic initiates accumulation of L2P mapping data corresponding to the sequentially written data. For example, the L2P mapping data can include a set of LTUs corresponding to respective physical locations of the sequentially written data. The processing logic can initiate the accumulation of the L2P mapping data by generating a command to initiate the accumulation of the L2P mapping data in response to receiving the request. For example, controller firmware can keep track of the aggregating or updating of the L2P mapping data, as well as making the L2P mapping data persistent on the memory device (e.g., NAND) on a periodic basis. However, during the accumulation of the L2P mapping data, a L2P mapping data structure is not updated. Accordingly, the processing logic causes a postponement of L2P mapping data structure updates during the accumulation of the L2P mapping data.

For example, assume that host intends to write 128 KB worth of data to the memory sub-system (e.g., SSD). Each request can be chunked by the controller into a size of 4 KB, so that 32 requests will be made in sequential fashion. Once the controller receives the write request for the first LTU (e.g. the request corresponds to $LTU_0$ for writing data to some block X, then the accumulation of L2P mapping data is initiated. In this case, the "length" field will be set to "1" in the L2P mapping data structure for the FPA. This accumulation data can be stored in an L2P buffer (e.g., SRAM) locally at the controller until it made persistent to the non-volatile memory (e.g., NAND memory). The controller can reserve fixed memory for storing the L2P data (e.g., cache memory). Then, the controller waits for the next write request (e.g., 4 KB request). If the next write request is a sequential write request with respect to the previous write request, then the controller firmware can further accumulate the L2P data. For example, if the request corresponds to $LTU_1$ for writing data to the same block X, then the length field will be updated to "2" in the L2P mapping data structure.

The accumulation will continue until the processing logic, at operation 440, determines that a criterion for terminating accumulation of the L2P mapping data is satisfied and, at operation 450, the processing logic terminates the accumulation of the L2P mapping data. The criterion can be included in a set of criteria for terminating accumulation of the L2P mapping data.

In some embodiments, determining that the criterion is satisfied can include determining that a number of accumulated contiguous locations is equal to a threshold of contiguous locations (e.g., 32/64/128 LTU threshold).

In some embodiments, determining that the criterion is satisfied can include determining that data is written to a new physical address. For example, the new physical address can corresponding to a different block than the current block (e.g., during block exchange after the current block becomes full).

In some embodiments, determining that the criterion is satisfied can include determines that the L2P buffer (e.g., SRAM) is full. This is because the L2P buffer can only hold a fixed number of entries.

At operation 460, the processing logic updates an L2P mapping data structure. More specifically, the L2P mapping data structure is updated with the accumulated L2P mapping data obtained after the termination of the accumulation of the L2P mapping data. The L2P mapping data structure can be maintained on volatile memory (e.g., DRAM). In some embodiments, updating the L2P mapping data structure includes updating a previously stored mapping data structure. In some embodiments, updating the L2P mapping data structure includes creating a new L2P mapping data structure.

For example, the L2P mapping data structure can be updated to maintain a starting address corresponding to an initial LTU associated with the sequentially written data, and a length of the sequentially written data from the starting physical address. In some embodiments, the starting physical address is a flash physical address (FPA). In some embodiments, the L2P mapping data structure is a table having an LTU column including an initial LTU entry, a starting physical address entry, and a length entry.

By updating the L2P mapping data structure in response to a sequential write operation as described herein, updates to the L2P mapping data structure can be made less frequently. Therefore, controller overhead can be reduced as compared to adding individual LTU entries to the L2P mapping data structure. As will be described in further detail below with reference to FIG. 5, instead of associating each LTU to an individual physical address, the starting physical address in combination with the length can be used to serve a read request with a single read to volatile memory, as opposed to multiple individual reads to volatile memory.

Figure 5:
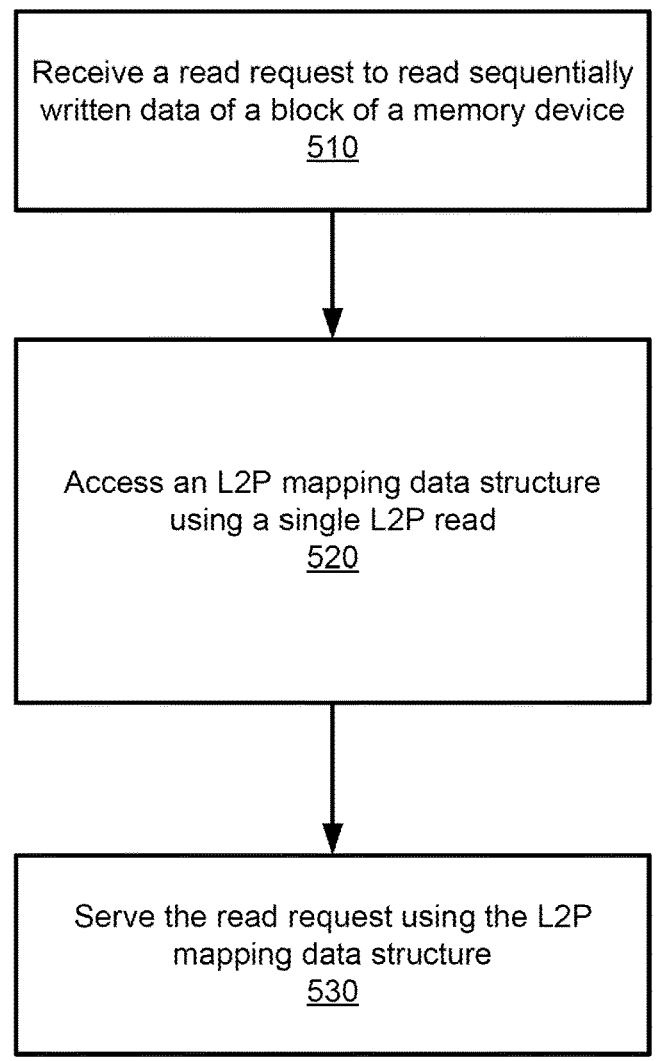
FIG. 5 is a flow diagram of an example method for catering a read request to read sequentially written data using a mapping data structure in accordance with some embodiments of the present disclosure.

FIG. 5 is a flow diagram of an example method for servicing a read request to read sequentially written data in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the L2P mapping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives a read request to read sequentially written data of a block of a memory device. For example, the read request can be a host system-initiated read request.

At operation 520, the processing logic accesses an L2P mapping data structure using a single L2P read. For example, the L2P mapping data structure can be maintained in volatile memory (e.g., DRAM). The L2P mapping data structure can include an initial LTU of a group of LTUs corresponding to the sequentially written data, a starting physical address corresponding to the initial LTU, and a length of the sequentially written data from the initial LTU. In some embodiments, the starting physical address is a flash physical address (FPA). For example, the mapping data structure can include a table having an LTU column including the initial LTU, a starting physical address entry, and a length entry.

Illustratively, if a host read request is received with respect to a group of LTUs corresponding to LTU #0 through LTU #31 (such that the length of the sequentially written data is 32), then the controller can issue a single L2P read) to volatile memory based on the initial LTU, the starting physical address and the length (as opposed to issuing 32 read requests to volatile memory to obtain L2P entries for each of LTU #0 through LTU #31). Accordingly, the L2P mapping data structure can serve read accesses with fewer L2P reads to volatile memory, which can boost performance.

At operation 530, the processing logic serves the read request by performing a read operation using the L2P mapping data structure.

For example, assume that host intends to write 128 KB worth of data to the memory sub-system (e.g., SSD). Each request can be chunked by the controller into a size of 4 KB, so that 32 requests will be made in sequential fashion. Once the controller receives the chunk for the first LTU, $LTU_0$, the controller obtains the corresponding L2P entry from the L2P mapping data structure. For example, the L2P entry can be obtained from volatile memory (e.g., DRAM). In this case, the L2P entry corresponding to $LTU_0$ includes the starting physical address (e.g., FPA) and length (e.g., 32). This information can be stored in the L2P buffer (e.g., SRAM) local to the controller as a look-up data structure for future reference. The controller can then issue a read request to the memory device (e.g., NAND) for $LTU_0$ using the starting physical address.

For the next chunk corresponding to the next LTU, $LTU_1$, the controller firmware can first refer to local memory for the L2P entry. In this case, the controller has the starting physical address, and the controller firmware can calculate the physical address corresponding to $LTU_1$ from the starting physical address and issue a read request to the memory device (e.g., NAND) for $LTU_1$. This process can continue for all remaining LTUs (e.g., $LTU_2$ through $LTU_{31}$). Accordingly, by maintaining the starting physical address and length information in the controller, the controller does not need to issue multiple independent L2P read requests to volatile memory (e.g., DRAM) for $LTU_1$ through $LTU_{31}$.

Figure 6:
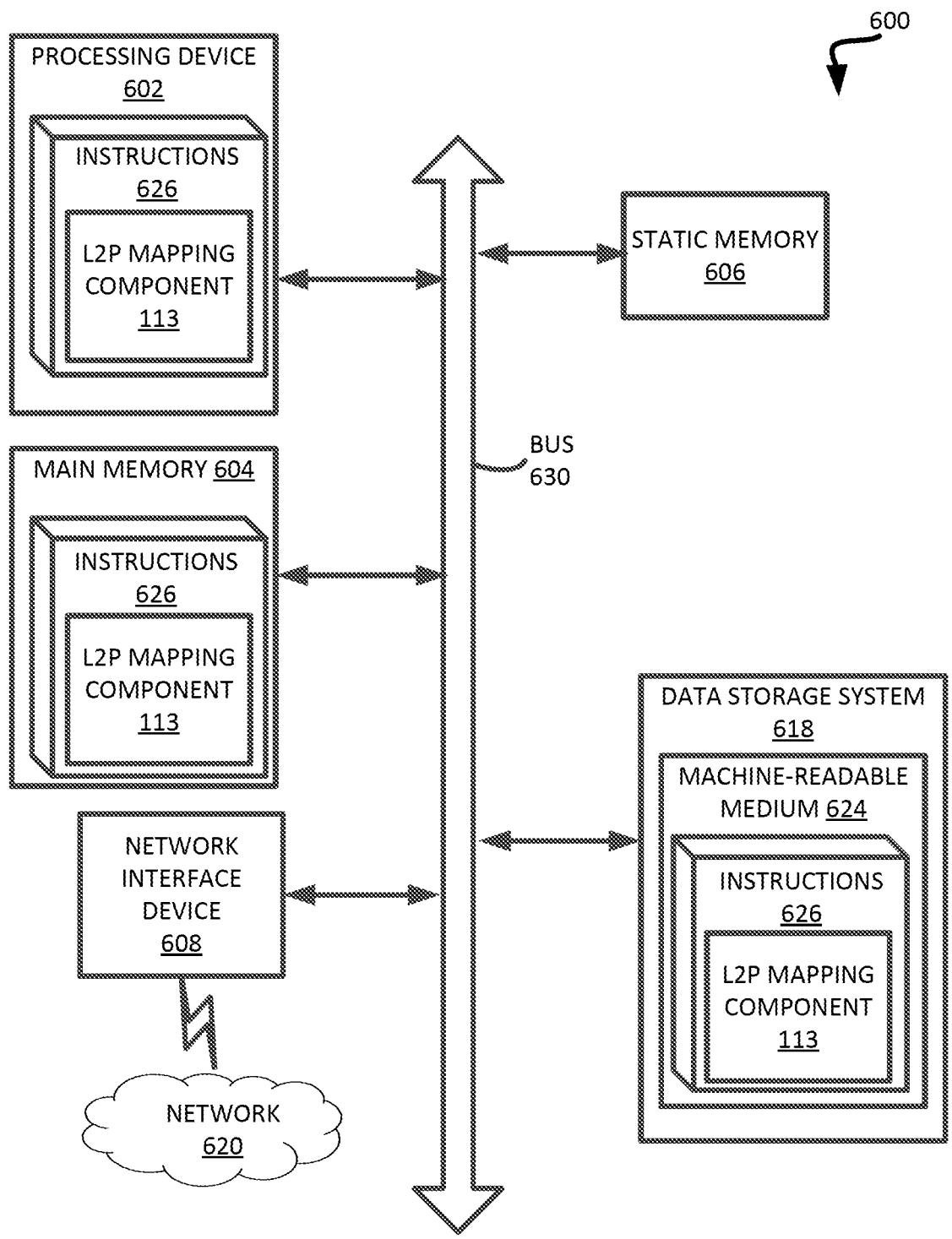
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the L2P mapping component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The compute6.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an L2P mapping component (e.g., the L2P mapping component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
storing, on a volatile memory device, logical-to-physical (L2P) mapping data corresponding to sequentially written data;
determining whether an L2P update criterion is satisfied; and
in response to determining that the L2P update criterion is satisfied, updating an L2P mapping data structure based on the L2P mapping data, wherein the L2P mapping data structure identifies an initial logical translation unit (LTU) of the sequentially written data and a length of the sequentially written data from the initial LTU.

2. The system of claim 1, wherein the L2P mapping data structure further maintains a starting physical address corresponding to the initial LTU.

3. The system of claim 2, wherein the starting physical address is a flash physical address (FPA).

4. The system of claim 1, wherein determining whether the L2P update criterion is satisfied comprises determining whether a number of LTUs of the L2P mapping data satisfies a threshold condition.

5. The system of claim 1, wherein determining whether the L2P update criterion is satisfied comprises determining whether data is being written to a new physical address.

6. The system of claim 1, wherein:
   storing the L2P mapping data comprises initiating accumulation of the L2P mapping data; and
   determining whether the L2P update criterion is satisfied comprises terminating the accumulation of the L2P mapping data during block exchange.

7. The system of claim 1, wherein determining whether the L2P update criterion is satisfied comprises determining that an L2P buffer is full.

8. A method comprising:
   storing, by a processing device on a volatile memory device, logical-to-physical (L2P) mapping data corresponding to sequentially written data;
   determining, by the processing device, whether an L2P update criterion is satisfied; and
   in response to determining that the L2P update criterion is satisfied, updating, by the processing device, an L2P mapping data structure based on the L2P mapping data, wherein the L2P mapping data structure identifies an initial logical translation unit (LTU) of the sequentially written data and a length of the sequentially written data from the initial LTU.

9. The method of claim 8, wherein the L2P mapping data structure further maintains a starting physical address corresponding to the initial LTU.

10. The method of claim 9, wherein the starting physical address is a flash physical address (FPA).

11. The method of claim 8, wherein determining whether the L2P update criterion is satisfied comprises determining whether a number of LTUs of the L2P mapping data satisfies a threshold condition.

12. The method of claim 8, wherein determining whether the L2P update criterion is satisfied comprises determining whether data is being written to a new physical address.

13. The method of claim 8, wherein:
   storing the L2P mapping data comprises initiating accumulation of the L2P mapping data; and
   determining whether the L2P update criterion is satisfied comprises terminating the accumulation of the L2P mapping data during block exchange.

14. The method of claim 8, wherein determining whether the L2P update criterion is satisfied comprises determining that an L2P buffer is full.

15. A non-transitory computer-readable storage medium comprising instructions that, when executed by a processing device, cause the processing device to perform operations comprising:
   storing, on a volatile memory device, logical-to-physical (L2P) mapping data corresponding to sequentially written data;
   determining whether an L2P update criterion is satisfied; and
   in response to determining that the L2P update criterion is satisfied, updating an L2P mapping data structure based on the L2P mapping data, wherein the L2P mapping data structure identifies an initial logical translation unit (LTU) of the sequentially written data and a length of the sequentially written data from the initial LTU.

16. The non-transitory computer-readable storage medium of claim 15, wherein the L2P mapping data structure further maintains a starting physical address corresponding to the initial LTU.

17. The non-transitory computer-readable storage medium of claim 15, wherein determining whether the L2P update criterion is satisfied comprises determining whether a number of LTUs of the L2P mapping data satisfies a threshold condition.

18. The non-transitory computer-readable storage medium of claim 15, wherein determining whether the L2P update criterion is satisfied comprises determining whether data is being written to a new physical address.

19. The non-transitory computer-readable storage medium of claim 15, wherein:
   storing the L2P mapping data comprises initiating accumulation of the L2P mapping data; and
   determining whether the L2P update criterion is satisfied comprises terminating the accumulation of the L2P mapping data during block exchange.

20. The non-transitory computer-readable storage medium of claim 15, wherein determining whether the L2P criterion is satisfied comprises determining whether an L2P buffer is full.

* * * * *